United States Patent
Roggero et al.

(10) Patent No.: US 7,672,270 B2
(45) Date of Patent: Mar. 2, 2010

(54) COMMUNICATION SYSTEM, METHOD OF COMMUNICATION BETWEEN AND AMONG VEHICLES AND VEHICLE COMPRISING SUCH A COMMUNICATION SYSTEM

(75) Inventors: Marco Roggero, Stuttgart (DE); Andries Van Wageningen, Wijlre (NL); Hans-Jürgen Reumerman, Aachen (DE); Marco Ruffini, Dublin (IE)

(73) Assignee: NXP B.V., Eindhoven (NL)

( * ) Notice: Subject to any disclaimer, the term of this patent is extended or adjusted under 35 U.S.C. 154(b) by 724 days.

(21) Appl. No.: 11/578,900

(22) PCT Filed: Apr. 29, 2005

(86) PCT No.: PCT/IB2005/051411

§ 371 (c)(1),
(2), (4) Date: Oct. 20, 2006

(87) PCT Pub. No.: WO2005/107181

PCT Pub. Date: Nov. 10, 2005

(65) Prior Publication Data

US 2007/0197230 A1    Aug. 23, 2007

(30) Foreign Application Priority Data

May 4, 2004    (EP) .................................. 04101904

(51) Int. Cl.
H04W 4/00    (2009.01)
(52) U.S. Cl. .................... 370/328; 701/300; 455/99
(58) Field of Classification Search ........... None
See application file for complete search history.

(56) References Cited

U.S. PATENT DOCUMENTS

| | | | | |
|---|---|---|---|---|
| 5,493,694 A | * | 2/1996 | Vlcek et al. | 455/521 |
| 6,397,149 B1 | | 5/2002 | Hashimoto | |
| 6,539,300 B2 | * | 3/2003 | Myr | 701/117 |

(Continued)

FOREIGN PATENT DOCUMENTS

WO    WO 01/01587    1/2001

(Continued)

OTHER PUBLICATIONS

Michael L B et al: "Interference Characteristics in Inter-Vehicle Communication From Oncoming Vehicles"; Vehicular Tech. Conf. 1999 Fall; IEEE VTS 50th Amsterdam, Netherlands; Sep. 19-22, 1999; Piscataway NJ USA vol. 2 9/19/199 pp. 753-757.

*Primary Examiner*—Ajit Patel

(57) ABSTRACT

In order to provide a communication system as well as a vehicle comprising such a communication system for communication between and among vehicles and a method for communication between and among vehicles moving in any different directions within the same area by means of at least one channel designed for transmitting at least one message, the channel comprising at least one code for communication of the vehicles within at least one cluster in which at least one group of vehicles are clustered, wherein interference is to be eliminated, the vehicle comprises directional antennas oriented in different directions in relation to the moving direction of the vehicle to enable the sending direction of the message to be allocatable to directions in relation to the moving direction of the vehicle and the channel is assigned to direction areas, north, east, south and west.

20 Claims, 10 Drawing Sheets

U.S. PATENT DOCUMENTS

| | | | |
|---|---|---|---|
| 6,731,777 B1 * | 5/2004 | Nishigaki et al. | 382/106 |
| 2002/0198632 A1 | 12/2002 | Breed et al. | |
| 2005/0273218 A1 * | 12/2005 | Breed et al. | 701/2 |
| 2008/0012726 A1 * | 1/2008 | Publicover | 340/932 |
| 2008/0247310 A1 * | 10/2008 | Ruffini et al. | 370/230 |

FOREIGN PATENT DOCUMENTS

| WO | WO 02/41643 | 5/2002 |
|---|---|---|

* cited by examiner

COMMUNICATION SYSTEM, METHOD OF COMMUNICATION BETWEEN AND AMONG VEHICLES AND VEHICLE COMPRISING SUCH A COMMUNICATION SYSTEM

The present invention relates to a communication system for as well as to a method of communication between and among vehicles by means of at least one channel designed for transmitting at least one message, the channel comprising at least one code for communication of the vehicles within at least one cluster in which at least one group of vehicles are clustered. The present invention further relates to a vehicle comprising such a communication system for communication between and among vehicles.

BACKGROUND

The use of inter-vehicular communication is an essential part of future smart cars and roads. For example, prior art document WO 01/01587 A2 discloses a dynamic wireless networking between vehicles, wherein each vehicle is capable of transmitting information and receiving information.

Generally, vehicle-to-vehicle messages can be exchanged in an ad hoc network by using a M[edium]AC[cess] protocol like IEEE802.11 that regulates the access to the shared communication medium without the usage of a central controller (cf. Ysuhiko Inoue, Masao Nagakawa, "MAC protocol for inter-vehicle communication network using spread spectrum technique", Vehicle navigation & information conference proceedings (IEEE), 1994).

Furthermore, in inter-vehicular communication, groups of vehicles can be clustered, for example by choosing a multicast ID in the cluster. In this context, prior art document U.S. Pat. No. 6,397,149 B1 discloses a processional travel control apparatus by which respective vehicle groups travelling in processions can be distinguished.

As long as the relative speed between the cars is low, the relative positional change of the cars is low and clustering is a not too difficult task. To establish and maintain a cluster, cars must not have a too large distance and must be also within this maximum distance during a longer period; otherwise, too much communication overhead will be required to keep the cluster up-to-date of the latest cluster configuration.

One of the main problems is that if two clusters come into contact they can interfere with each other. For this reason, the clusters have to be separated using different channels. To this aim, prior art document U.S. Pat. No. 6,397,149 B1 proposes to assign the frequency band according to the vehicle group ID. To achieve communication between vehicles in the same lane without interfering with communication between vehicles in other lanes, one of the frequencies is switched to a different frequency when the vehicle groups approach each other and when the frequency bands of the vehicle groups have been the same.

Since the number of available channels is directly bound to the cost of the communication system, this number of available channels has to be kept as low as possible, so a re-use of the channels is required. In this context, the problem arises that clusters travelling in opposite directions will come into contact with each other quite often whereby the probability of the clusters using the same channel can be quite high (depending on the number of channels available).

Another common problem occurring when IEEE802.11 compliant equipment is used outdoors is the so-called "hidden node problem". This problem occurs when a wireless node cannot hear one or more of the other wireless nodes, as a consequence of which the media access protocol cannot function properly. When this happens, multiple nodes will attempt to transmit their data over the shared medium simultaneously, causing signal interference with one another and consequently collisions on data transmission.

The hidden node problem gets an extra dimension when a C[lear]T[o]S[end] signal from a receiver might be valid at the moment the CTS is given but a short time later a car approaching the cluster might interfere the data transfer without being aware of it.

One of the main difficulties in vehicle-to-vehicle networks, in particular in car-to-car networks, is that the configuration of the network changes rapidly due to the velocity of the individual nodes especially if the vehicles have different directions. In connection therewith or independently thereof, another problem is the rapidly changing density of the cars.

In this context, it has to be taken into consideration that power control mechanisms, collision avoidance techniques and synchronization normally need some time to adapt to a new situation. If the available time is not sufficient, these techniques will fail and the network performance can collapse.

A potential solution for these problems might be found by setting up a separate channel for each peer-to-peer connection and for each cluster communication. However, this would make the receiver of a node quite expensive to support all its active channels in parallel. Moreover, the number of frequencies would have to be very high, in case the channels are separated by frequency.

Concerning the above-mentioned M[edium]AC[cess] layer of a protocol for car-to-car communication purpose, a lot of work has already been done. The problem of medium accessing becomes of primary importance because the number of nodes and their mobility can vary within a very large range as well as on a very large scale.

Some conventional solutions have been proposed that consider

T[ime]D[ivision]M[ultiple]A[ccess] (cf. Lechlan B. Michael, Masao Nakagawa, "Non-platoon inter-vehicle communication using multiple hops", IEEE Trans. Commun. Vol. E82-B No. 10, October 1999) or C[ode]D[ivision]M[ultiple]A[ccess] (cf. Ysuhiko Inoue, Masao Nagakawa, "MAC protocol for inter-vehicle communication network using spread spectrum technique", Vehicle navigation & information conference proceedings (IEEE), 1994).

In this context, CDMA seems to be the preferable solution because CDMA does not require any synchronization, which could be quite difficult to achieve in a decentralized and highly variable environment. However, in case the channels are separated by CDMA for setting up a separate channel for each peer-to-peer connection and each cluster communication the codes would have to be very long for differentiating the channels.

By using smart antenna arrays, it is possible to use S[pace]D[ivision]M[ultiple]A[ccess]. In this case, users may use the same frequency, time, or code allocations over the air interface and may only be separated spatially. This enables SDMA to be a complementary scheme to F[requency]D[ivision]M[ultiple]A[ccess], T[ime]D[ivision]M[ultiple]A[ccess], and C[ode]D[ivision]M[ultiple]A[ccess]; thus, S[pace]D[ivision]M[ultiple]A[ccess] provides increased capacity within congested areas (cf.

http://www.xilinx.com/publications/xcellonline/partners/xc_pdf/xc_nallatec h45.pdf). In this context, prior art document WO 02/41643 A2 discloses a method for operating a synchronous SDMA and a CDMA.

Anyway, cluster organization seems to bring significant advantages with respect to simple peer-to-peer connections. One of the main issues when considering clustering for car-to-car communication purpose is how to separate different clusters to avoid interference. Some work has already been done concerning ways to separate codes in car-to-car environment.

In this context, prior art document US 2002/0198632 A1 discloses a method and an arrangement for communicating between vehicles wherein a code depending on the area where the vehicles are located is assigned. This anyway seems to require a real large number of codes, and does not resolve the problem associated with the interference between clusters of cars travelling in opposite directions.

In the prior art article "Interference characteristics in inter-vehicle communication from oncoming vehicles" from Lachlan B. Michael and Masao Nakagawa, (Vehicular Technology Conference, Amsterdam, Netherlands, September 1999, volume 2, pages 753 to 757, ISBN 0-7803-5435-4), the use of directional or beam antennas, coupled with separating the frequency band into forward transmit/reverse receive operation, and reverse transmit/forward receive operation is proposed to solve the problems of interference from oncoming vehicles.

Since this known system is only based on forward and backward directions, it is feasible only to reduce interference between cars having opposite directions. Thus, the system presented in this article is not suitable when a vehicle is passing a cross-over or a car is entering a highway, because it is not possible to make a difference between cars having an other direction than forward or reverse; for example, this known system does not enable to make a difference between cars having west-to-east direction and cars having southwest-to-northeast direction.

Starting from the disadvantages and shortcomings as described above and taking the prior art as discussed into account, an object of the present invention is to provide a communication system as well as a vehicle comprising such a communication system and a communication method for vehicles moving in any different directions within the same area, wherein interference is to be eliminated.

The object of the present invention is achieved by a communication system comprising the features of claim 1 as well as by a method comprising the features of claim 5 and by a vehicle comprising the features of claim 11. Advantageous embodiments and expedient improvements of the present invention are disclosed in the respective dependent claims.

The present invention is principally based on the idea of direction dependent channel selection for ad hoc wireless network of vehicles wherein a pre-clustering of at least one network can be defined.

BRIEF SUMMARY

According to the present invention, the problem associated with the interference between clusters of vehicles moving in different directions is solved by the communication system as described above characterized in that the channel is assigned to at least one direction area, for example north, east, south or west and that the sending direction of the message can be allocated to at least one of any directions in relation to the moving direction of the vehicle, for example forward, backward and/or sideward.

In further accordance to the present invention, the vehicle comprises at least one, preferably two or more directional antennas oriented in different directions in relation to the moving direction of the vehicle, for example forward, backward and/or sideward. Although sectorized antennas are a commercial product (see as an example http://www.m-rcbroadcast.com/datasheets2/QuadSector_Rx.pdf) such antennas are not used for vehicle-to-vehicle communication yet. The use of directional antennas for vehicle-to-vehicle communication allows a direction selection for each message.

As a consequence, the system according to the present invention as well as the method according to the present invention are suitable when a vehicle is passing a cross-over or a car is entering a highway, because the present invention enables to make a difference between cars having an other direction than forward or reverse; for example, the present invention enables to make a difference between cars having west-to-east direction and cars having southwest-to-northeast direction.

Thus, in a preferred embodiment of the present invention every vehicle is equipped with directional antennas and favourably in each sent message a flag indicates if it was sent forward, backward, left or right from the car; in particular, a message sent by different antennas in different directions will contain flags to indicate its respective sending direction.

In an advantageous embodiment of the present invention, the code for communication of the vehicles within one cluster can be assigned depending on the vehicle direction, which leads to the additional advantage that the number of required codes is low.

To avoid too many channels, the communication system can be restricted to a couple of common channels. These common channels can be organized depending on the type of communication, for example awareness messages being sent by at least one broadcast channel,
 emergency warning messages being sent by at least one broadcast channel,
 messages within clusters being sent by at least one multicast channel, and
 messages between pairs of cars being sent by at least one peer-to-peer communication channel.

Moreover, the vehicle optionally comprises at least one direction determining unit for determining the moving direction of the vehicle; by providing this optional feature, favourably every vehicle in the network is able to find out its direction.

Additionally the vehicle optionally comprises at least one selection unit for selecting the channel for communication, wherein the selection of the channel is optionally dependent on the moving direction of the vehicle. Thus, a preferable embodiment of the present invention is for example a vehicle-to-vehicle ad hoc wireless network in which the direction of the vehicle is taken into account for selection of the channel and preferably every vehicle can select one or more channels for communication.

Furthermore, the vehicle optionally comprises at least one transmitter unit for sending the message, in particular with identification means, with position, with speed, with time stamp and/or with direction of the vehicle, to other vehicles, wherein the transmitter unit can be part of the directional antenna. Thus, in a preferred embodiment of the present invention every vehicle in the network makes itself aware to the other vehicles in the neighbourhood by sending repetitive broadcast (alive) message with ID, with position, with speed, with time stamp and/or with direction.

In a further preferred embodiment of the present invention, a message to be transmitted from at least one first vehicle to at least one second vehicle being out of the communication range of the first vehicle is carried and/or forwarded by at least one vehicle (=so-called intermediate vehicle) being between the first vehicle and the second vehicle.

As already stated above, the present invention further relates to the method of communicating between and among vehicles by means of at least one channel. The sending direction of the message is allocated to at least one of any directions in relation to the moving direction of the vehicle, for example forward, backward and/or sideward, and the message is sent by at least one, preferably two or more directional antennas.

According to a preferred embodiment of the present invention, the available channel is assigned to a direction area for each type of communication. Furthermore, the moving direction of the vehicle can preferably be determined and the direction of the vehicle can be classified in for example north, north-west, west, south-west, etc.

Moreover, the channel can be selected wherein the selection of the channel is optionally dependent on the moving direction of the vehicle and the message is sent to other vehicles via the channel.

The channel separation is optionally accomplished by use of C[ode]D[ivision]M[ultiple]A[ccess], while the access within a channel is optionally controlled by C[arrier]S[ense]M[ultiple]A[ccess]-C[ollision]A[voidance].

In order to avoid too many codes the number of codes being used optionally depends on the environment of the cluster, in particular on the road topology. For example if vehicles are moving on a lane, in particular on a road, without intersections only two codes will be used, for instance for the direction north and for the direction south.

In case vehicles are moving on a road with an X-Cross, at least four codes are optionally used; in case vehicles are moving on more complex topologies with several roads next to each other having different directions, exemplarily up to sixteen codes can be used.

Thus, in a preferred embodiment of the present invention depending on its direction the vehicle, in particular the selection unit of the vehicle, chooses only one channel or two channels within a communication type; for example, a vehicle having west-northwest as a direction in an area where eight codes (namely north, northeast, east, southeast, south, southwest, west, northwest) are used will use at the same time codes for two different directions: west and northwest.

In case of necessity, for example in a highly congested area, the code assignment can be re-adapted: if there are N codes available and the road mainly goes in one direction without many intersections with secondary streets, preferably only two directions, exemplarily the north direction versus the south direction, are differentiated, and preferably N/2 codes are assigned to each direction. In this way, also clusters that travel in the same direction and are very close to each other can be physically separated in an inventive manner.

BRIEF DESCRIPTION OF THE DRAWINGS

As already discussed above, there are several options to embody as well as to improve the teaching of the present invention in an advantageous manner. To this aim, reference is made to the claims dependent on claim 1 and on claim 5; further improvements, features and advantages of the present invention are explained below in more detail with reference to a preferred embodiment by way of example and to the accompanying drawings where

The same reference numerals are used for corresponding parts in FIG. 1 to FIG. 10.

DETAILED DESCRIPTION

Figure 1:
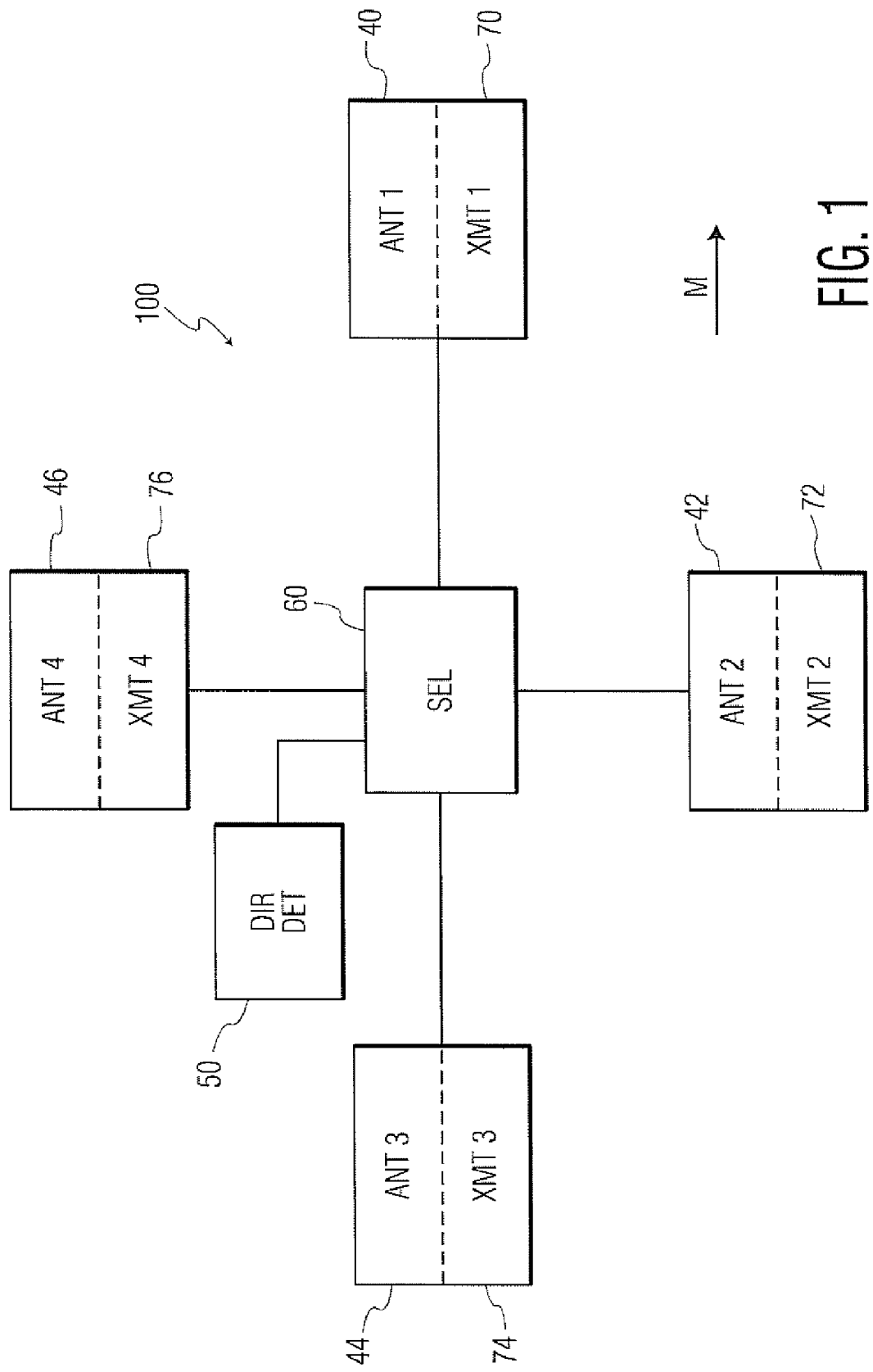
FIG. 1 shows schematically an embodiment of a communication system according to the present invention using the method according to the present invention.

In FIG. 1, an example of an arrangement for inter-vehicular communication or a communication system 100, namely a car-to-car communication system, according to the present invention is depicted.

According to this communication system 100, each car comprises
- a direction determining unit 50 for determining the moving direction M of the car and
- a selection unit 60 for selecting a communication channel.

This selection unit 60 is connected
- with the direction determining unit 50,
- with a first directional antenna 40, a second directional antenna 42, a third directional antenna 44 and a fourth directional antenna 46, as well as
- with a first transmitter unit 70, a second transmitter unit 72, a third transmitter unit 74 and a fourth transmitter unit 76.

Moreover, each transmitter unit 70, 72, 74, 76 is in contact with the respective directional antenna 40, 42, 44, 46, wherein
- the first directional antenna 40 is part of the first transmitter unit 70,
- the second directional antenna 42 is part of the second transmitter unit 72,
- the third directional antenna 44 is part of the third transmitter unit 74, and
- the fourth directional antenna 46 is part of the fourth transmitter unit 76.

Figure 2:
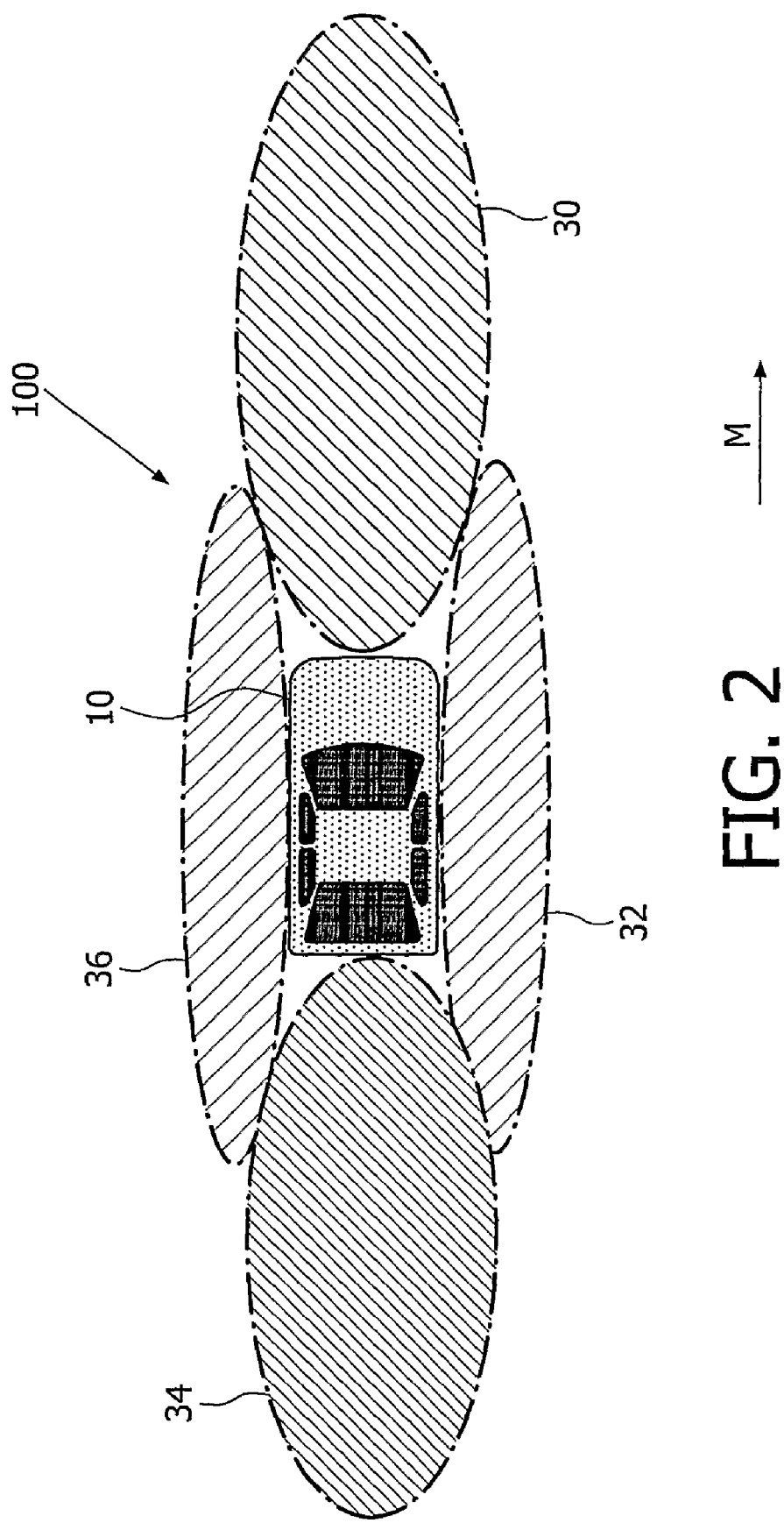
FIG. 2 shows schematically an embodiment of an allocation of messages according to the communication system of FIG. 1.

These directional antennas 40, 42, 44, 46 are designed for a direction selection of each message 30, 32, 34, 36 as depicted in FIG. 2. By means of the directional antennas 40, 42, 44, 46, messages can be separated for example into
- first messages 30 being sent forward with respect to the car 10, second messages 32 being sent to the right side of the car 10, third messages 34 being sent backward with respect to the car 10 as well as fourth messages 36 being sent to the left side of the car 10.

In FIG. 3 to FIG. 8, some example scenarios for communication according to the communication system 100 are shown, wherein cars are communicating on a limited number of channels to other cars. In this context, it may be noted that the system according to the article "Interference characteristics in inter-vehicle communication from oncoming vehicles" (Vehicular Technology Conference, Amsterdam, Netherlands, September 1999, volume 2, pages 753 to 757, ISBN 0-7803-5435-4) is not suitable for the applications as illustrated in FIG. 3 to FIG. 8.

Figure 3:
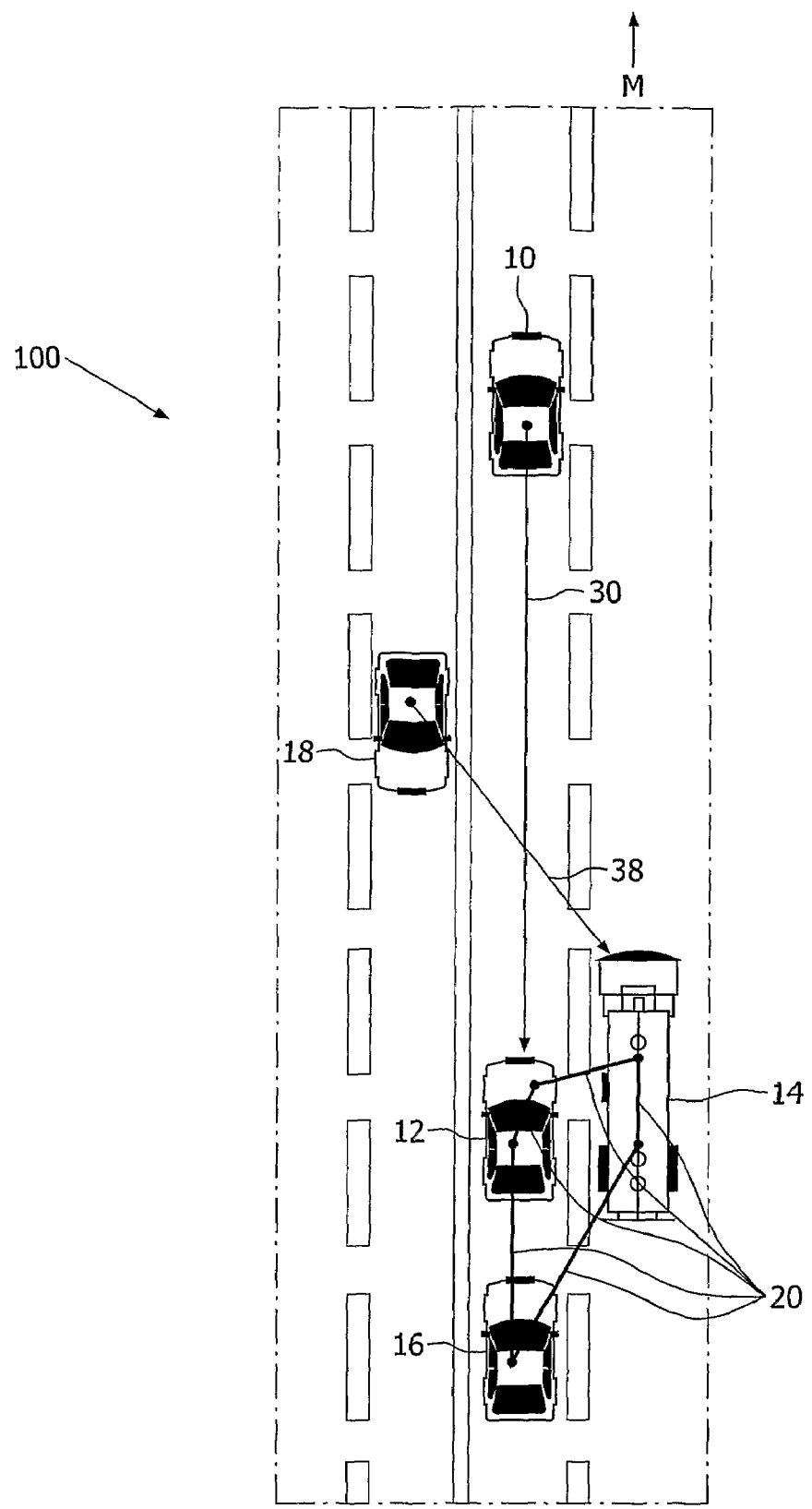
FIG. 3 shows schematically a first example of communication in the communication system of FIG. 1.

To reduce interference, a code for communication of the cars 10, 12, 14, 16, 18 is assigned in dependence on the respective moving direction of the cars 10, 12, 14, 16, 18 (cf. FIG. 3). For example, on a bidirectional highway section having two lanes in west-to-east direction and two lanes in east-to-west direction, three cars, namely a first car 12, a second car 14 and a third car 16, having west-to-east direction are communicating in a cluster 20 using the specific code assigned to their west-to-east direction.

In the example depicted in FIG. 3, the car 12 belonging to the cluster 20 receives a first message 30 with west-to-east direction code from a car 10 which is entering the communication range of the cluster 20. Since the car 10 is using the same code and is having the same direction as the cars 12, 14, 16 being part of the cluster 20, cluster topology update algorithms can start.

At the same time, alive messages as well as warning messages 38 using east-to-west direction code will be ignored by the cluster 20; in other words, communication between cars having opposite directions will not interfere with each other; in particular, the message 30 having west-to-east direction code does not interfere with the message 38 having east-to-west direction code (cf. FIG. 3).

Apart from that, the present invention also enables to distinguish between messages comprising a respective code for any sending direction in relation to the moving direction M (cf. FIG. 1) of the respective vehicle.

To achieve this technical aim, according to the communication system 100 every car uses a frequency or a code which is depending on car direction; thus, messages sent by cars having for example west-to-east direction can be distinguished from messages sent by cars having any other direction, for example southwest-to-northeast direction. To avoid collisions, it is in particular in situations as shown in FIG. 4 crucial to differentiate between messages sent into different directions.

Figure 4:
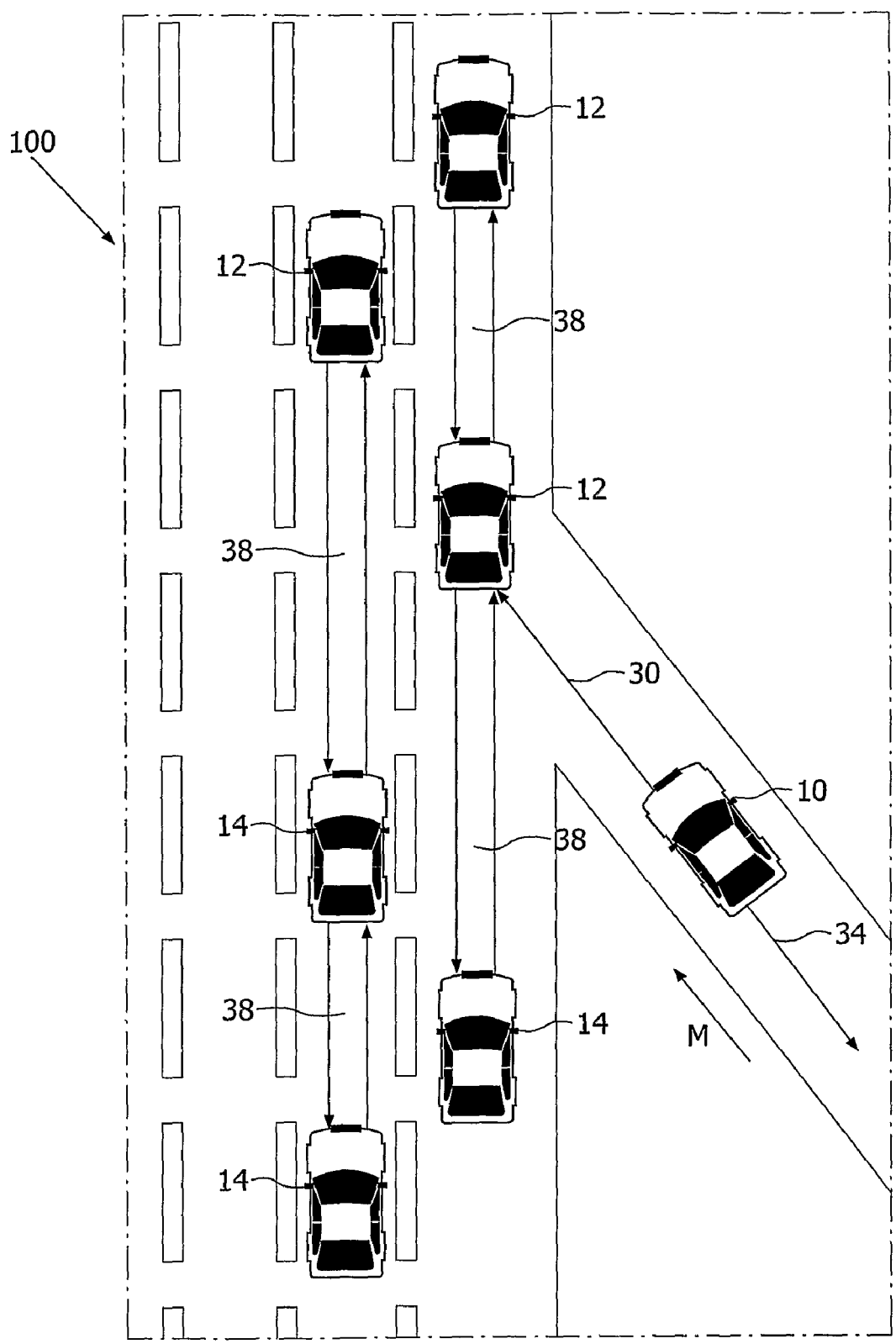
FIG. 4 shows schematically a second example of communication in the communication system of FIG. 1.

In FIG. 4, a car 10 is entering a highway in southwest-to-northeast direction. The cars 12, 14 on the highway in west-to-east direction communicate with the entering car 10 (cf. for example message 30 from the car 10 to the next car 12), wherein the communication system 100 is able to differentiate the cars 12, 14 having west-to-east direction and communicating by way of west-to-east messages 38 from cars having southwest-to-northeast direction as well as the cars 12 having already passed the entrance from the cars 14 having not yet passed the entrance.

Figure 5:
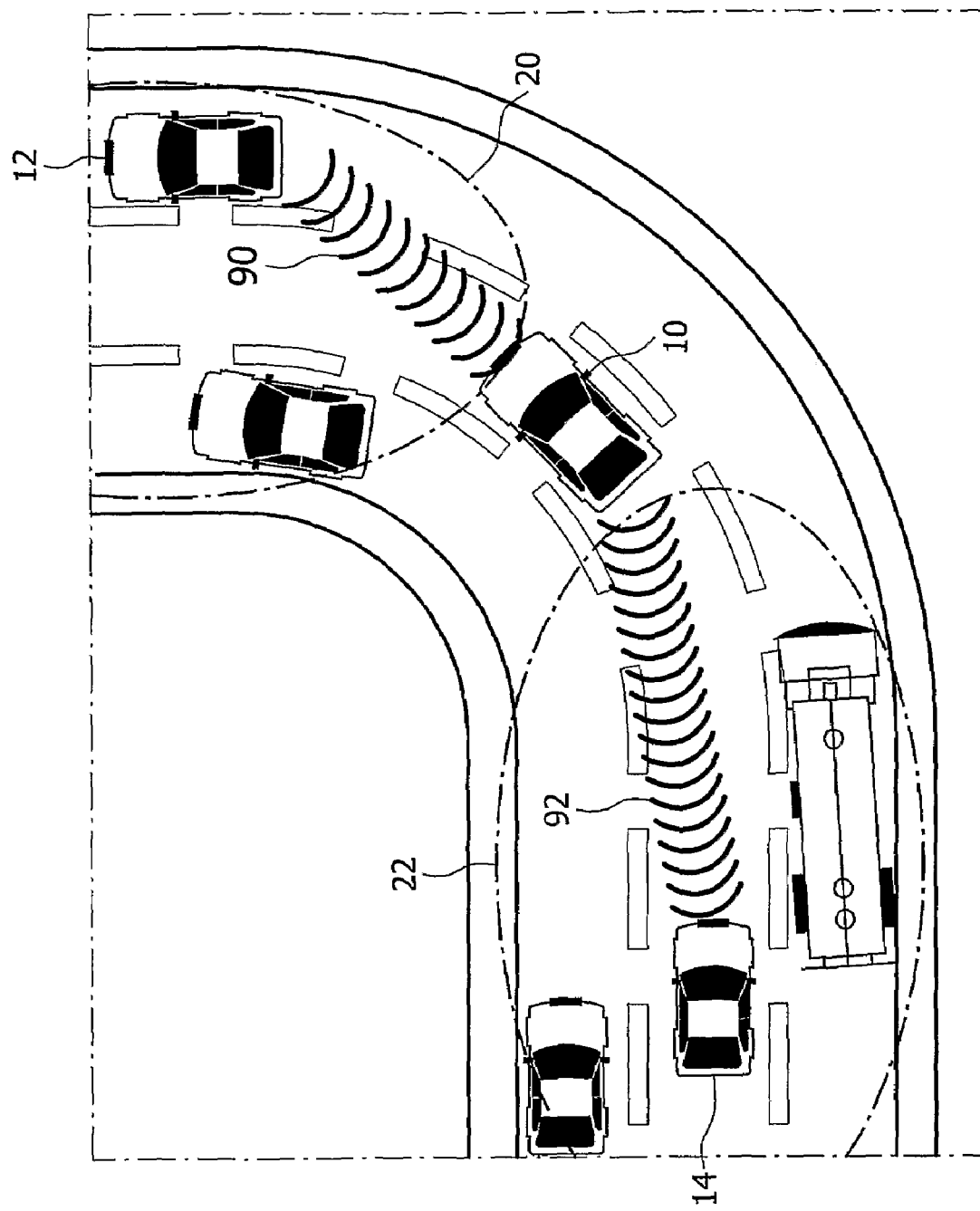
FIG. 5 shows schematically a third example of communication in the communication system of FIG. 1.

FIG. 5 explains the behaviour of the communication system 100 in case of change in highway direction, for instance in case of a curve or of a turn. A car 10 is driving in west-to-east direction on the highway, but a little further the highway turns to a different direction, namely to south-to-north direction. As a consequence, the car 10 selects two different channels 90, 92, for example a south-to-north channel 90 and a west-to-east channel 92, in order to be able to communicate in parallel via the south-to-north code with cars 12 being clustered (=reference numeral 20) in front of the car 10 as well as via the west-to-east code with cars 14 being clustered (=reference numeral 22) behind the car 10 (cf. FIG. 5).

Figure 6:
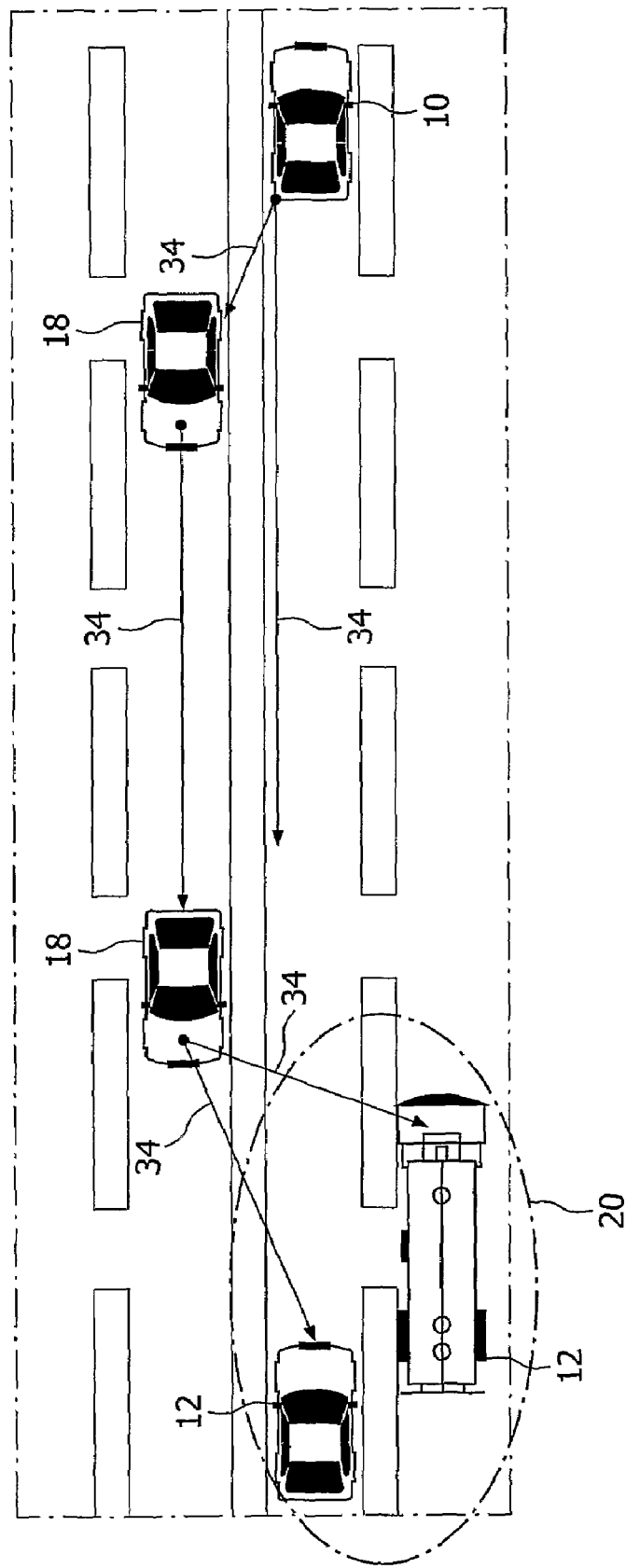
FIG. 6 shows schematically a fourth example of communication in the communication system of FIG. 1.

In FIG. 6, an example for enlarging the admissible communication range of the arrangement 100 for communicating is given. In this example, a warning message 34 is to be sent backwards by a car 10 having west-to-east direction but the distance between the car 10 and two following cars 12 is greater than the admissible communication range of the communication system 100.

In this case, a car 18 being between the emitting car 10 and the potentially receiving cars 12 and running on the opposite east-to-west direction receives this west-to-east message 34 and is able to understand by means of the used code that the message 34 is valid and important for the cars 12; thus, the intermediate car 18 being close to the sending car 10 immediately forwards the message 34 to the receiving cars 12 via a further intermediate car 18 being close to these receiving cars 12.

Alternatively, the message 34 to be transmitted can be carried by the (first) intermediate car 18 and can be forwarded to the cars 12 later in time.

By both of these ways, the warning message 34 can also reach the cars 12 which are out of the actual communication range of the communication arrangement 100 assigned to the car 10 (cf. FIG. 6).

Figure 7:
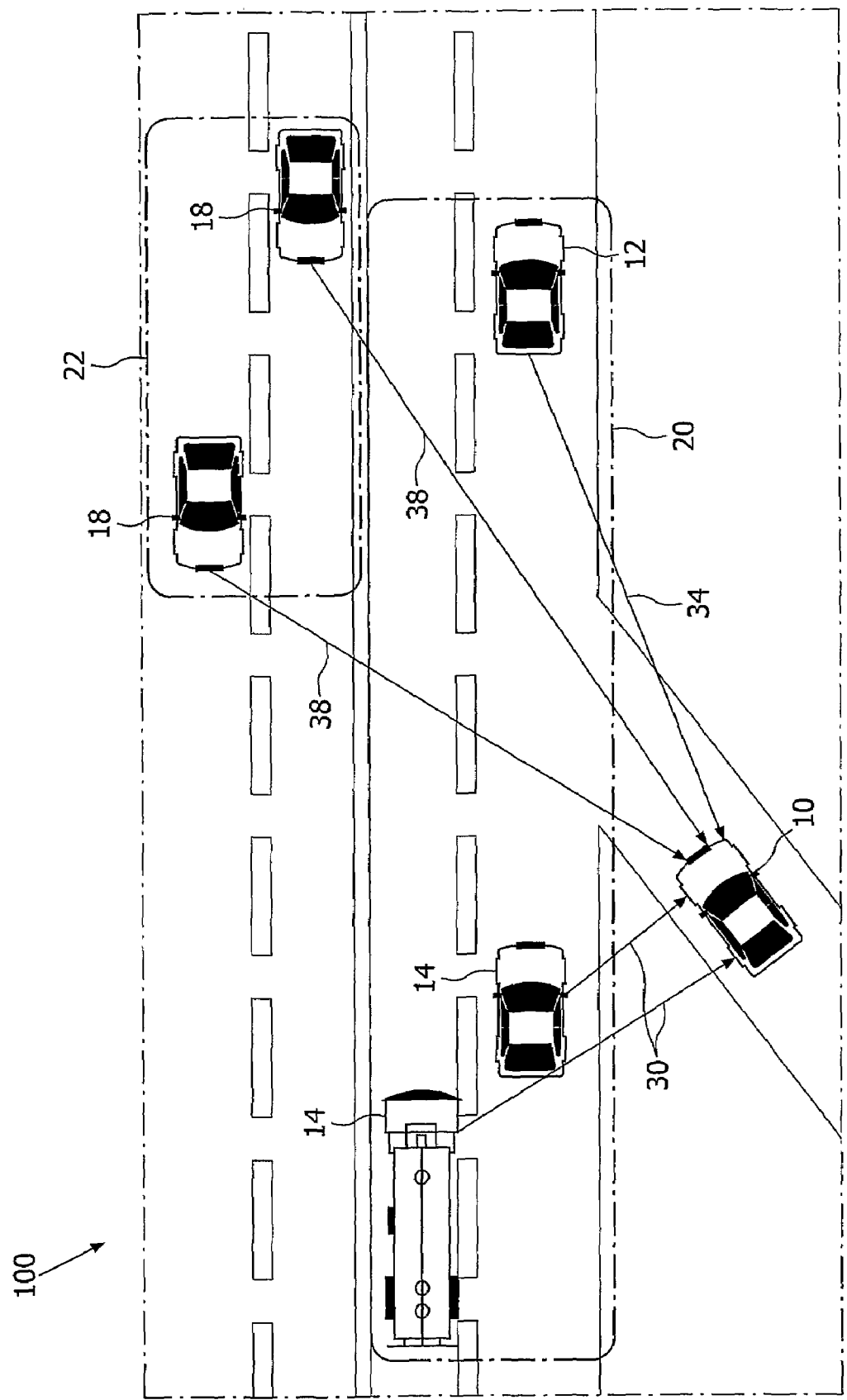
FIG. 7 shows schematically a fifth example of communication in the communication system of FIG. 1.

In FIG. 7, an application of the communication system 100 is shown where a car 10 is entering a highway in west-to-east direction: The driver of the car 10 wants to know if he can enter or if he has to wait until the road is free. In this case, the entering car 10 only accepts (, i.e. listens to) messages 30 transmitted by cars 12, 14 (corresponding to a first cluster 20) with west-to-east direction code, whereas messages 38 transmitted by cars 18 (corresponding to a second cluster 22) with east-to-west direction code are not important and therefore are not received and accepted by the entering car 10.

The entering car 10 will receive and accept two different kinds of messages 30, 34 using west-to-east direction code, namely messages 30 from approaching cars 14: if the entering car 10 receives this kind of message 30, the car 10 will wait because the road is not free; and messages 34 from cars 12 being already ahead: if the entering car 10 receives this kind of message 34, the car 10 will ignore it because this message 34 contains flags indicating that this message 34 was sent backward.

Figure 8:
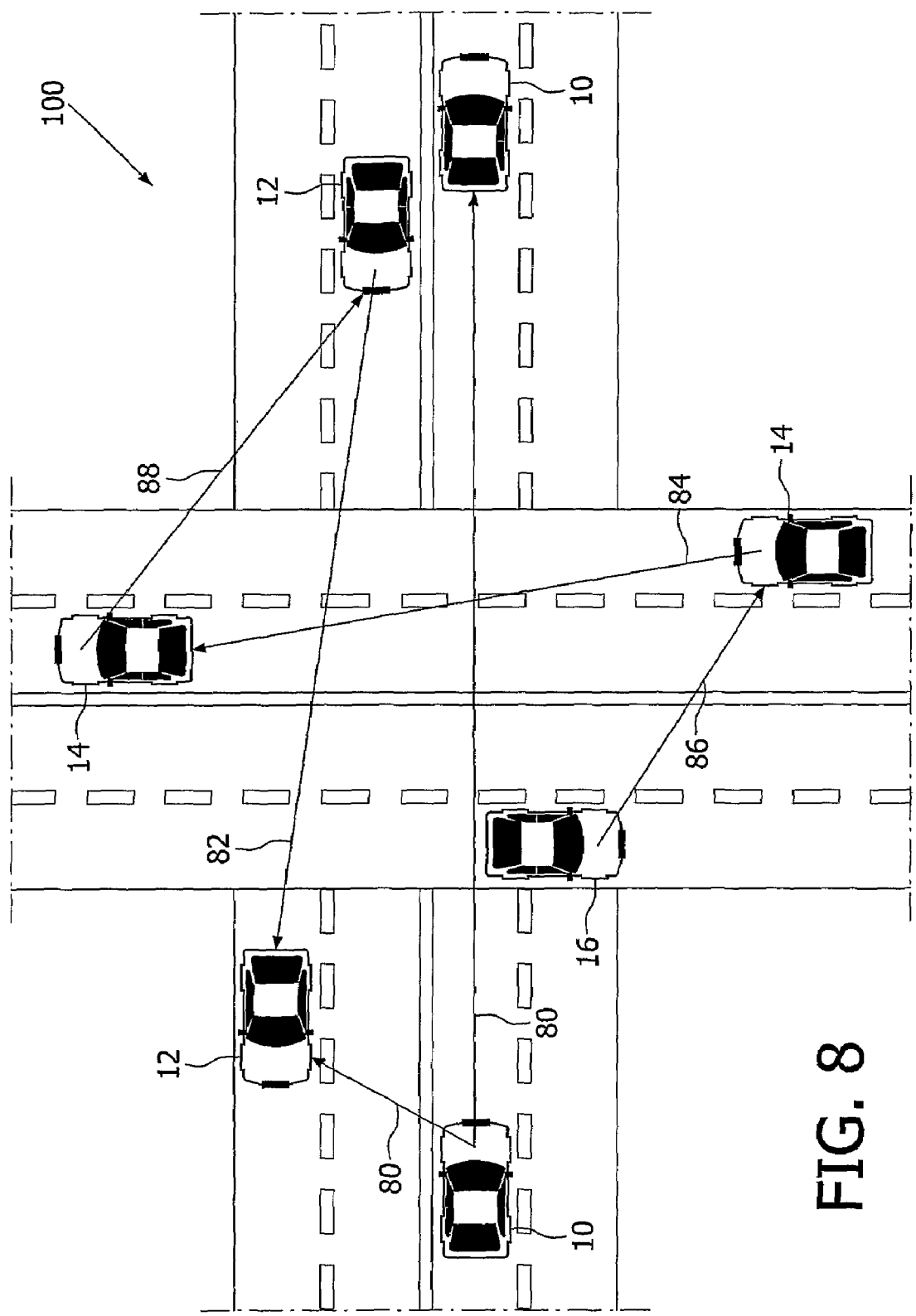
FIG. 8 shows schematically a sixth example of communication in the communication system of FIG. 1.

FIG. 8 shows a traffic situation next to a cross-over where a number of cars are communicating. Because of the cross-over constellation, communication is only required between the vehicles 10 having west-to-east direction and the vehicles 12 having east-to-west direction and between the vehicles 14 having south-to-north direction and the vehicles 16 having north-to-south direction, but neither between the vehicles 10 and the vehicles 14, 16 nor between the vehicles 12 and the vehicles 14, 16.

In FIG. 8, the reference numerals 80, 82, 84, 86, 88 indicate the codes (as used for communication) instead of the messages. To reduce the interference in the vicinity of the cross-over, the use of different codes for each direction, namely a first code 80 for west-to-east direction,
a second code 82 for east-to-west direction,
a third code 84 for south-to-north direction and
a fourth code 86 for north-to-south direction, combined with information provided by G[lobal]P[ositioning]S[ystem] and maps giving information on the road topology, enables the cars 10, 12, 14, 16 to select and filter the respectively relevant messages.

Since a message with a non-acceptable code 88 sent by the car 14 on the south-to-north road is neither important for the cars 10 on the west-to-east road nor for the cars 12 on the east-to-west road, such message is ignored by the cars 10, 12. This results
in a reduced interference from the cars 14, 16 in relation to the cars 10, 12 as well as
in a reduced interference from the cars 10, 12 in relation to the cars 14, 16
being in the same area but not on the same road.

Figure 9A:
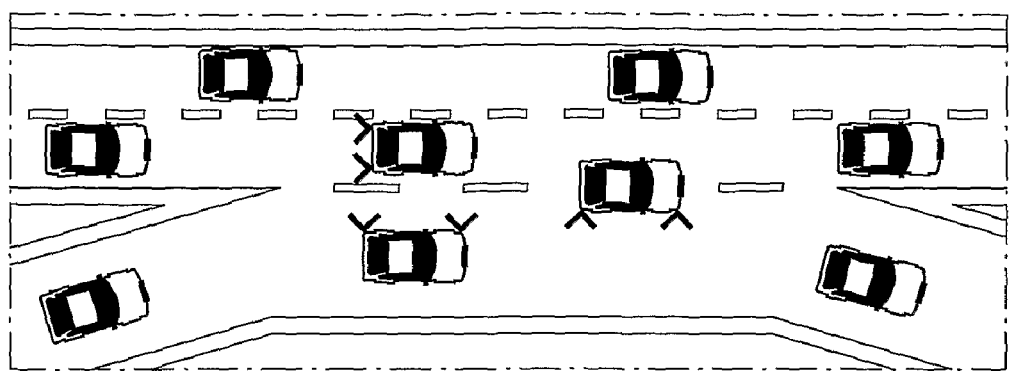
FIG. 9A shows schematically a first example of application of inter-vehicular communication in the case of lane change or merge manoeuvre (Source: CarTalk project)
Figure 9B:
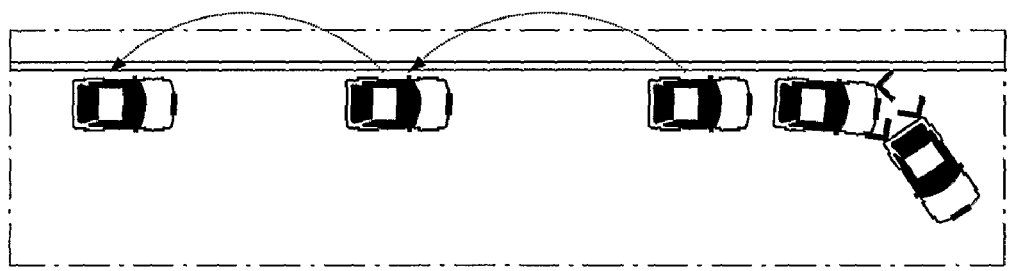
FIG. 9B shows schematically a second example of application of inter-vehicular communication in the case of an accident ahead (Source: CarTalk project)
Figure 9C:
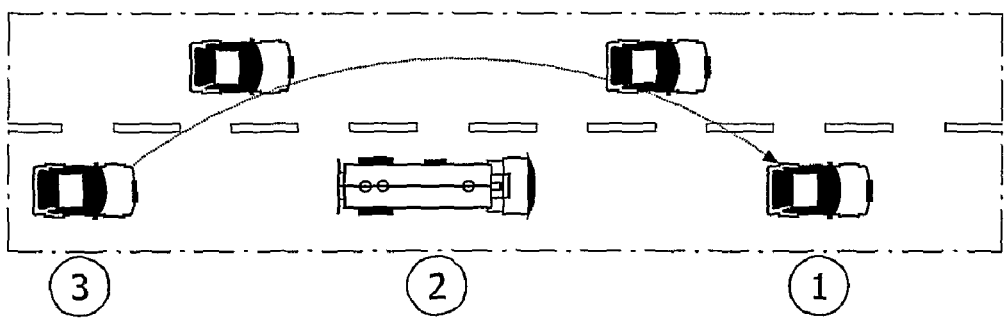
FIG. 9C shows schematically a third example of application of inter-vehicular communication in the case of an invisible obstacle (Source: CarTalk project)

The disclosure of the present invention relates in general to the field of car-to-car communication, in particular with the aim of accident-free driving. Thus, the communication system 100 according to the present invention can be used for cooperative interaction of cars and for distributing in particular warning messages, especially
in order to avoid collisions during lane change or merge manoeuvres (cf. FIG. 9A),
for reporting an accident on the lanes used (cf. FIG. 9B), and
for reporting an "invisible" obstacle, for example an obscured or shadowed object (cf. FIG. 9C),
when vehicles are moving in different directions within the same area.

Figure 10:
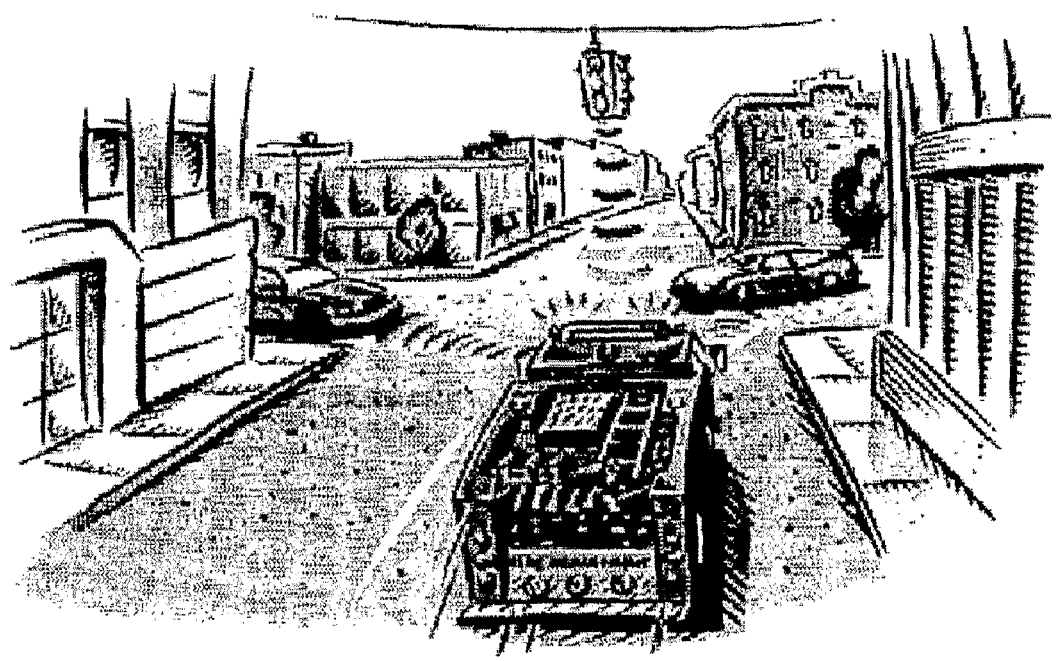
FIG. 10 shows perspectively a fourth example of application of inter-vehicular communication in the case of a crossing or of an intersection (Source: US DoT: intelligent vehicle initiative).

Likewise, car-to-car communication is considered crucial for intersection collision avoidance, in particular to avoid collisions when cars are entering an intersection that should be kept free for a fire truck (cf. FIG. 10) or the like.

LIST OF REFERENCE NUMERALS

100 communication system or arrangement for inter-vehicular communicating
10 first vehicle, in particular first car
12 second vehicle, in particular second car
14 third vehicle, in particular third car
16 fourth vehicle, in particular fourth car
18 fifth vehicle,
in particular car having opposite direction to the vehicles 10, 12, 14, 16 and/or
in particular intermediate car being between the first vehicle 10 and the second vehicle 12
20 cluster, in particular first cluster
22 second cluster
30 first message,
in particular into forward direction with respect to the moving direction M
32 second message,
in particular into right direction with respect to the moving direction M
34 third message,
in particular into backward direction with respect to the moving direction M
36 fourth message,
in particular into left direction with respect to the moving direction M
38 further message,
in particular into diagonal direction with respect to the moving direction M
40 first directional antenna
42 second directional antenna
44 third directional antenna
46 fourth directional antenna
50 direction determining unit
60 selection unit
70 first transmitter unit
72 second transmitter unit
74 third transmitter unit
76 fourth transmitter unit
80 first code, in particular west-to-east code
82 second code, in particular east-to-west code
84 third code, in particular south-to-north code
86 fourth code, in particular north-to-south code
88 non-acceptable code
90 first channel, in particular south-to-north channel
92 second channel, in particular west-to-east channel
M moving direction of the vehicle 10

The invention claimed is:

1. A system of communication among moving vehicles by means of a wireless network, the system comprising:
   a direction determining unit that uses a moving direction of a first vehicle to assign a first direction code to a first message, wherein the first direction code classifies the moving direction of the first vehicle into one direction area of at least four possible direction areas;
   a selection unit connected to the direction determining unit that selects a communication channel based upon the first direction code;
   a plurality of directional antennas that broadcast the first message with the first direction code from the first vehicle to a second vehicle and receive a second message over the selected communication channel with a second direction code sent from the second vehicle to the first vehicle, wherein the plurality of directional antennas ignore the second message when the second direction code does not match the direction code currently assigned to the first message.

2. The system of claim 1, wherein every vehicle in the wireless network sends an alive message comprising identification, position, speed, and time stamp information.

3. The system of claim 1, wherein the system is restricted to particular messages.

4. The system of claim 1, wherein an intermediate vehicle forwards the first message from the first vehicle to the second vehicle when the second vehicle is out of a communication range of the first vehicle.

5. A method of communication among moving vehicles in a wireless network, the method comprising:
   assigning a first direction code to a first message based upon a moving direction of a first vehicle, wherein the first direction code classifies the moving direction of the first vehicle into one direction area of at least four possible direction areas;
   selecting a communication channel based upon the first direction code;
   broadcasting the first message with the first direction code from a plurality of directional antennas in the first vehicle to a second vehicle over the selected communication channel; and
   receiving a second message with a second direction code sent from the second vehicle to the first vehicle, wherein the plurality of directional antennas ignore the second message when the second direction code does not match the direction code currently assigned to the first message.

6. The method according to claim 5, further comprising:
sending, with the plurality of directional antennas, an alive message comprising identification, position, speed, and time stamp information.

7. The method according to claim 5, further comprising:
adding a flag to the first message, wherein the flag indicates which directional antenna in the first vehicle broadcast the first message.

8. The method according to claim 5, further comprising:
redefining direction codes based on road topology.

9. The method according to claim 5, further comprising:
using an intermediate vehicle to forward the first message from the first vehicle to the second vehicle when the second vehicle is out of a communication range of the first vehicle.

10. The method of claim 5, further comprising:
sending, with the plurality of directional antennas, warning messages, wherein the warning messages comprise at least one of:
a report of an invisible obstacle;
a report of an accident; and
information needed to avoid a collision.

11. The system of claim 2, wherein the alive message further comprises directional information.

12. The system of claim 3, wherein the particular messages are awareness messages sent by at least one broadcast channel.

13. The system of claim 3, wherein the particular messages are emergency warning messages sent by at least one broadcast channel.

14. The system of claim 3, wherein the particular messages are messages within clusters sent by at least one multicast channel.

15. The system of claim 3, wherein the particular messages are messages between pairs of cars sent by at least one peer-to-peer communication channel.

16. The method of claim 7, wherein the flag designates whether the first message was broadcast forward, right, backward, or left with respect to the directional antennas in the first vehicle.

17. The system of claim 1, wherein there are at least eight direction areas.

18. The method of claim 5, wherein there are at least eight direction areas.

19. The system of claim 1, wherein up to sixteen direction codes are used.

20. The method of claim 5, wherein up to sixteen direction codes are used.

* * * * *